US012069570B2

(12) United States Patent
Yuan et al.

(10) Patent No.: US 12,069,570 B2
(45) Date of Patent: Aug. 20, 2024

(54) PROCESSING METHOD AND PROCESSING DEVICE FOR SAVING ENERGY OF BASE STATION

(71) Applicant: CHINA TELECOM CORPORATION LIMITED, Beijing (CN)

(72) Inventors: Jingjing Yuan, Beijing (CN); Zhongyuan Lu, Beijing (CN); Le Zhang, Beijing (CN); Ying Wang, Beijing (CN)

(73) Assignee: CHINA TELECOM CORPORATION LIMITED, Beijing (CN)

( * ) Notice: Subject to any disclaimer, the term of this patent is extended or adjusted under 35 U.S.C. 154(b) by 0 days.

(21) Appl. No.: 18/018,783

(22) PCT Filed: Jul. 27, 2021

(86) PCT No.: PCT/CN2021/108555
§ 371 (c)(1),
(2) Date: Jan. 30, 2023

(87) PCT Pub. No.: WO2022/022486
PCT Pub. Date: Feb. 3, 2022

(65) Prior Publication Data
US 2024/0040501 A1 Feb. 1, 2024

(30) Foreign Application Priority Data
Jul. 31, 2020 (CN) .......................... 202010763391.8

(51) Int. Cl.
H04W 52/02 (2009.01)
(52) U.S. Cl.
CPC ............... *H04W 52/0206* (2013.01)
(58) Field of Classification Search
CPC .................................. H04W 52/0206
See application file for complete search history.

(56) References Cited

U.S. PATENT DOCUMENTS 10,887,726 B2 * 1/2021 Huang ................ H04W 64/006
2003/0125044 A1 7/2003 Deloach, Jr. et al.
(Continued)

FOREIGN PATENT DOCUMENTS

CN 101453747 A 6/2009
CN 105159262 A 12/2015
(Continued)

OTHER PUBLICATIONS

Wang, Next Location Prediction Based on an Adaboost-Markov Model of Mobile Users, 2019, PubMed Central Id: 6470696 Digital Object Identifier: 10.3390/s19061475 ISSN: 1424-8220 (Year: 2019).*
(Continued)

Primary Examiner — Jinsong Hu
Assistant Examiner — Nicole M Louis-Fils
(74) Attorney, Agent, or Firm — Andrew M. Calderon; Calderon Safran & Wright, PC

(57) ABSTRACT

A processing method and a processing device for saving energy of a base station are provided. The method includes: obtaining engineering parameter data and MR data of a base station; gridding the MR data to obtain grid MR data, and calculating a calculated value of longitude and latitude data of the base station according to the grid MR data; comparing the calculated value of the longitude and latitude data of the base station with longitude and latitude data of the base station in the engineering parameter data to select engineering parameter data, which is input into a load prediction model, of the base station; inputting the engineering parameter data of the base station selected into the load prediction model to train and predict the load prediction model; and issuing a corresponding power-saving turn-off strategy according to a prediction result of the load prediction model.

14 Claims, 8 Drawing Sheets

(56) References Cited

U.S. PATENT DOCUMENTS

| | | | |
|---|---|---|---|
| 2010/0093377 A1 | | 4/2010 | Riley et al. |
| 2013/0244643 A1 | | 9/2013 | Yokoyama |
| 2013/0279368 A1 | | 10/2013 | Chou et al. |
| 2015/0373641 A1 | * | 12/2015 | Yamana ............... H04W 24/02 370/328 |
| 2016/0286479 A1 | | 9/2016 | Karkera et al. |
| 2017/0208560 A1 | | 7/2017 | Papa et al. |
| 2023/0179490 A1 | * | 6/2023 | Huangfu ............... H04L 43/08 370/252 |

FOREIGN PATENT DOCUMENTS

| | | | | |
|---|---|---|---|---|
| CN | 108111965 A | | 6/2018 | |
| CN | 109982333 A | | 7/2019 | |
| CN | 110912627 A | * | 3/2020 | ........... H04B 17/318 |
| CN | 110933592 A | | 3/2020 | |
| CN | 111194045 A | | 5/2020 | |
| JP | 2011139252 A | | 7/2011 | |
| JP | 2015-501615 A | | 1/2015 | |
| JP | 2017-504244 A | | 2/2017 | |
| KR | 10-2004-0068352 A | | 7/2004 | |
| WO | 2010/075803 A1 | | 7/2010 | |
| WO | 2012/101738 A1 | | 8/2012 | |

OTHER PUBLICATIONS

International Search Report issued on Oct. 18, 2021 in corresponding Application No. PCT/CN2021/108555; 5 pages.

Liang et al. "Research on Intelligent Energy Saving Technology of 5G Base Station Based on AI", doi:10.3969/j.issn. 1006-1010.2019. 12.006; 1006-1010(2019)12-0032-05; Dec. 2019; 5 pages.

Notification to Grant Patent Right for Invention issued on Aug. 25, 2022 in corresponding Chinese Patent Application No. 202010763391. 8; 9 pages.

Extended European Search Report issued on Feb. 5, 2024 in corresponding EP Application No. 21850341.5-1206, 5 pages.

First Office Action for Chinese Application No. 2023-506517 dated Oct. 30, 2023, with English Translation, 6 pages.

First Office Action for Korean Application No. 9-5-2023-088343793 dated Nov. 26, 2023 with English Translation, 5 pages.

Notice of Allowance for Korean Application No. 9-5-2024-005815292 dated Jan. 17, 2024 with English Translation, 4 pages.

* cited by examiner

PROCESSING METHOD AND PROCESSING DEVICE FOR SAVING ENERGY OF BASE STATION

CROSS-REFERENCE TO RELATED APPLICATIONS

The present application is a U.S. National Stage Application under 35 U.S.C. § 371 of International Patent Application No. PCT/CN2021/108555, filed on Jul. 27, 2021, which claims priority to China Patent Application No. 202010763391.8 filed on Jul. 31, 2020, the disclosure of both of which are incorporated by reference herein in entirety.

TECHNICAL FIELD

The present disclosure relates to a processing method and a processing device for saving energy of a base station.

BACKGROUND

In the era of 5G (5th Generation Mobile Communication Technology), with the introduction of new technologies such as MIMO (Multiple Input Multiple Output), the power consumption of 5G network exceeds 5 to 12 times that of 4G network, and the difficulty of network operation and maintenance increases. The high energy consumption in main facilities of the base station is a problem for operators to be solved. At present, a relatively popular solution for energy saving of the base station is to make use of AI (Artificial Intelligence) technology to perform load prediction and formulate the radio frequency turn-off strategy of the base station in advance to achieve the purpose of energy-saving.

SUMMARY

According to an aspect of the present disclosure, a processing method for saving energy of a base station is provided. The processing method comprises: obtaining engineering parameter data and measurement report (MR) data of the base station, wherein the engineering parameter data comprises longitude and latitude data of the base station obtained by measurement, and the MR data comprises longitude and latitude data of a user terminal reported by the user terminal; gridding the MR data to obtain grid MR data, and calculating a calculated value of longitude and latitude data of the base station according to the grid MR data, wherein the grid MR data comprises a grid longitude and latitude; comparing the calculated value of the longitude and latitude data of the base station with the longitude and latitude data of the base station in the engineering parameter data to select the engineering parameter data of the base station to be input into a load prediction model; inputting the engineering parameter data of the base station selected into the load prediction model to perform training and prediction of the load prediction model; and issuing a corresponding power-saving turn-off strategy according to a prediction result of the load prediction model.

In some embodiments, the engineering parameter data further comprises direction angle data of the base station obtained by measurement, the MR data further comprises direction angle data of the user terminal reported by the user terminal, and the grid MR data further comprises a grid direction angle; the processing method further comprises: selecting the engineering parameter data of the base station for determining a co-coverage cell according to the direction angle data in the engineering parameter data of the base station selected and the grid direction angle in the grid MR data corresponding to the base station selected; and obtaining the co-coverage cell according to the engineering parameter data of the base station for determining the co-coverage cell; and the issuing of the corresponding power-saving turn-off strategy comprises: issuing the corresponding power-saving turn-off strategy according to the prediction result of the load prediction model and the co-coverage cell obtained.

In some embodiments, the grid MR data further comprises: a base station type, an average reference signal receiving power (RSRP), a base station identification, the grid direction angle and number of a MR within a grid; and the calculating of the calculated value of the longitude and latitude data of the base station according to the grid MR data comprises: selecting the grid MR data with an outdoor base station as the base station type, corresponding to a base station with a predetermined number of cells, and with the average RSRP greater than a first threshold; grouping the grid MR data according to the base station identification and the direction angle data of the base station to allocate the grid MR data into a corresponding cell; performing outlier detection on the grid MR data of each cell to remove abnormal grid MR data; calculating an average longitude and latitude of each cell of each base station according to the grid longitude and latitude in remaining grid MR data; and calculating an average longitude and latitude of the base station according to the average longitude and latitude of the each cell of the each base station, wherein the average longitude and latitude of the base station is the calculated value of the longitude and latitude data of the base station.

In some embodiments, the comparing of the calculated value of the longitude and latitude data of the base station with the longitude and latitude data of the base station in the engineering parameter data comprises: calculating a distance relationship value between the calculated value of the longitude and latitude of the base station and the longitude and latitude data of the base station in the engineering parameter data according to a distance calculation method; and selecting the engineering parameter data of the base station with the distance relationship value less than a second threshold as the engineering parameter data of the base station to be input into the load prediction model.

In some embodiments, the performing of the outlier detection on the grid MR data of the each cell comprises: setting a critical point K value as K=a third threshold*a sum of the number of the MR within the grid of the each cell, wherein the third threshold is a percentage; calculating a local outlier factor (LOF) value of each grid MR data of the each cell by using the critical point K value; and removing the grid MR data with the LOF value greater than a fourth threshold.

In some embodiments, the selecting of the engineering parameter data of the base station for determining the co-coverage cell according to the direction angle data in the engineering parameter data of the base station selected and the grid direction angle in the grid MR data corresponding to the base station selected comprises: grouping the grid MR data of the base station selected according to the base station identification and the direction angle data of the base station, calculating a ratio of the number of the MR within each grid in each group to a sum of the number of the MR in the each group, and removing the grid MR data with the ratio less than a fifth threshold; grouping remaining grid MR data again according to the base station identification, and performing cell classification on the grid MR data in each group after grouping again by using a Gaussian kernel density function; calculating the direction angle data of each grid by using the grid longitude and latitude of each grid MR data of each cell obtained by the cell classification; calculating an average value of the direction angle data of the each cell according to the direction angle data of the each grid of the each cell, wherein the average value of the direction angle data of the each cell is used as a direction angle of the each cell; calculating a difference between the direction angle of the each cell of the base station and the direction angle data of the base station in the engineering parameter data, and calculating an average value of the difference; and making the engineering parameter data of the base station with the average value of the difference less than a sixth threshold as the engineering parameter data of the base station for determining the co-coverage cell.

In some embodiments, the inputting of the engineering parameter data of the base station selected into the load prediction model to perform the training and the prediction of the load prediction model comprises: performing outlier removal on the engineering parameter data of the base station selected; clustering prediction points represented by the longitude and latitude data of the base station in the engineering parameter data by a density clustering algorithm, constructing features for training the load prediction model, and mining a density relationship between the prediction points to represent a clustering relationship between the prediction points; and after clustering the prediction points and constructing the features, performing model training based on a machine learning algorithm by using the engineering parameter data of the base station selected, the features and corresponding performance index data, and performing model accuracy evaluation.

In some embodiments, the engineering parameter data of the base station further comprises a frequency band of the base station; and the obtaining of the co-coverage cell according to the engineering parameter data of the base station for determining the co-coverage cell comprises: combining a plurality of cells two by two according to the frequency band to obtain, respectively, two cells corresponding to two frequency bands; calculating a distance between the two cells according to two longitude and latitude data of the base station in the engineering parameter data of the base station for determining the co-coverage cell corresponding to the two cells, and calculating a difference of two direction angle data of the base station in the engineering parameter data of the base station for determining the co-coverage cell corresponding to the two cells; and determining that the two cells are the co-coverage cell in a case where the distance between the two cells is less than a seventh threshold and the difference of the two direction angle data is less than an eighth threshold.

In some embodiments, the processing method comprises: iterating the prediction result of the load prediction model and the corresponding power-saving turn-off strategy with a user perception index as an optimization target.

According to another aspect of the present disclosure, a processing device for energy saving of a base station is provided. The processing device comprises: an obtaining unit configured to obtain engineering parameter data and measurement report (MR) data of the base station, wherein the engineering parameter data comprises longitude and latitude data of the base station obtained by measurement, and the MR data comprises longitude and latitude data of a user terminal reported by the user terminal; a data processing unit configured to grid the MR data to obtain grid MR data, and calculate a calculated value of longitude and latitude data of the base station according to the grid MR data, wherein the grid MR data comprises a grid longitude and latitude; a parameter selecting unit configured to compare the calculated value of the longitude and latitude data of the base station with the longitude and latitude data of the base station in the engineering parameter data to select the engineering parameter data of the base station to be input into a load prediction model; a training prediction unit configured to input the engineering parameter data of the base station selected into the load prediction model to perform training and prediction of the load prediction model; and a strategy issuing unit configured to issue a corresponding power-saving turn-off strategy according to a prediction result of the load prediction model.

In some embodiments, the engineering parameter data further comprises direction angle data of the base station obtained by measurement, the MR data further comprises direction angle data of the user terminal reported by the user terminal, and the grid MR data further comprises a grid direction angle; the parameter selecting unit is further configured to select the engineering parameter data of the base station for determining a co-coverage cell according to the direction angle data in the engineering parameter data of the base station selected and the grid direction angle in the grid MR data corresponding to the base station selected; the obtaining unit is further configured to obtain the co-coverage cell according to the engineering parameter data of the base station for determining the co-coverage cell; and the strategy issuing unit is configured to issue the corresponding power-saving turn-off strategy according to the prediction result of the load prediction model and the co-coverage cell obtained.

In some embodiments, the grid MR data further comprises: a base station type, an average reference signal receiving power (RSRP), a base station identification, the grid direction angle and number of a MR within a grid; the data processing unit is configured to select the grid MR data with an outdoor base station as the base station type, corresponding to a base station with a predetermined number of cells, and with the average RSRP greater than a first threshold, group the grid MR data according to the base station identification and the direction angle data of the base station to allocate the grid MR data into a corresponding cell, perform outlier detection on the grid MR data of each cell to remove abnormal grid MR data, calculate an average longitude and latitude of each cell of each base station according to the grid longitude and latitude in remaining grid MR data, and calculate an average longitude and latitude of the base station according to the average longitude and latitude of the each cell of the each base station, wherein the average longitude and latitude of the base station is the calculated value of the longitude and latitude data of the base station.

In some embodiments, the parameter selecting unit is configured to calculate a distance relationship value between the calculated value of the longitude and latitude of the base station and the longitude and latitude data of the base station in the engineering parameter data according to a distance calculation method, and select the engineering parameter data of the base station with the distance relationship value less than a second threshold as the engineering parameter data of the base station to be input into the load prediction model.

In some embodiments, the data processing unit is configured to set a critical point K value as K=a third threshold*a sum of the number of the MR within the grid of the each cell, wherein the third threshold is a percentage, calculate a local outlier factor (LOF) value of each grid MR data of the each cell by using the critical point K value, and remove the grid MR data with the LOF value greater than a fourth threshold.

In some embodiments, the parameter selecting unit is configured to group the grid MR data of the base station selected according to the base station identification and the direction angle data of the base station, calculate a ratio of the number of the MR within each grid in each group to a sum of the number of the MR in the each group, remove the grid MR data with the ratio less than a fifth threshold, group remaining grid MR data again according to the base station identification, and perform cell classification on the grid MR data in each group after grouping again by using a Gaussian kernel density function, calculate the direction angle data of each grid by using the grid longitude and latitude of each grid MR data of each cell obtained by the cell classification, calculate an average value of the direction angle data of the each cell according to the direction angle data of the each grid of the each cell, wherein the average value of the direction angle data of the each cell is used as a direction angle of the each cell, calculate a difference between the direction angle of the each cell of the base station and the direction angle data of the base station in the engineering parameter data, calculate an average value of the difference, and make the engineering parameter data of the base station with the average value of the difference less than a sixth threshold as the engineering parameter data of the base station for determining the co-coverage cell.

In some embodiments, the training prediction unit is configured to perform outlier removal on the engineering parameter data of the base station selected, cluster prediction points represented by the longitude and latitude data of the base station in the engineering parameter data by a density clustering algorithm, construct features for training the load prediction model, mine a density relationship between the prediction points to represent a clustering relationship between the prediction points, after clustering the prediction points and constructing the features, perform model training based on a machine learning algorithm by using the engineering parameter data of the base station selected, the features and corresponding performance index data, and perform model accuracy evaluation.

In some embodiments, the engineering parameter data of the base station further comprises a frequency band of the base station; and the obtaining unit is configured to combine a plurality of cells two by two according to the frequency band to obtain, respectively, two cells corresponding to two frequency bands, calculate a distance between the two cells according to two longitude and latitude data of the base station in the engineering parameter data of the base station for determining the co-coverage cell corresponding to the two cells, calculate a difference of two direction angle data of the base station in the engineering parameter data of the base station for determining the co-coverage cell corresponding to the two cells, and determine that the two cells are the co-coverage cell in a case where the distance between the two cells is less than a seventh threshold and the difference of the two direction angle data is less than an eighth threshold.

In some embodiments, the strategy issuing unit is further configured to iterate the prediction result of the load prediction model and the corresponding power-saving turn-off strategy with a user perception index as an optimization target.

According to another aspect of the present disclosure, a processing device for saving energy of a base station is provided. The processing device comprises: a memory; and a processor coupled to the memory, wherein the processor is configured to perform the processing method described above based on instructions stored in the memory.

According to another aspect of the present disclosure, a non-transitory computer-readable storage medium having computer program instructions stored thereon that, when executed by a processor, implement the processing method described above is provided.

Other features and advantages of the present disclosure will become apparent from the following detailed description of exemplary embodiments of the present disclosure with reference to the accompanying drawings.

BRIEF DESCRIPTION OF THE ACCOMPANYING DRAWINGS

The accompanying drawings which constitute a part of this specification, illustrate the embodiments of the present disclosure, and together with this specification, serve to explain the principles of the present disclosure.

The present disclosure may be more explicitly understood from the following detailed description with reference to the accompanying drawings, in which.

DETAILED DESCRIPTION

Various exemplary embodiments of the present disclosure will now be described in detail with reference to the accompanying drawings. It should be noted that: unless additionally specified, the relative arrangements of the components and steps, numerical expressions and numerical values expounded in these examples do not limit the scope of the present disclosure.

At the same time, it should be understood that, for ease of description, the dimensions of various parts shown in the accompanying drawings are not drawn according to actual proportional relations.

The following description of at least one exemplary embodiment is in fact merely illustrative and is in no way intended as any limitation on the present disclosure as well as its application or use.

The techniques, methods, and devices known to a common technical person in the relevant art may not be discussed in detail, but where appropriate, the techniques, methods, and devices should be considered as part of the description.

Among all the examples shown and discussed here, any specific value shall be construed as being merely exemplary, rather than as being restrictive. Thus, other examples in the exemplary embodiments may have different values.

It is to be noted that: similar reference signs and letters present similar items in the following accompanying drawings, and therefore, once an item is defined in one accompanying drawing, no further discussion of it is required in the subsequent accompanying drawings.

The inventors of the present disclosure have found that, the method for making use of AI technology to perform load prediction so as to achieve energy saving in the related art is present with the following technical problem: when load prediction is performed based on AI technology, the longitude and latitude in the engineering parameter are not checked in advance. The longitude and latitude of the base station are important training data of the model. Moreover, sometimes the engineering parameter is present with the problem that it is erroneous or not updated in time. If checking of the longitude and latitude is not performed in advance, the prediction accuracy of the model may be reduced, and the effect of energy saving may be further affected.

In view of this, the embodiments of the present disclosure provide a processing method for saving energy of a base station to improve the prediction accuracy of the model.

Figure 1:
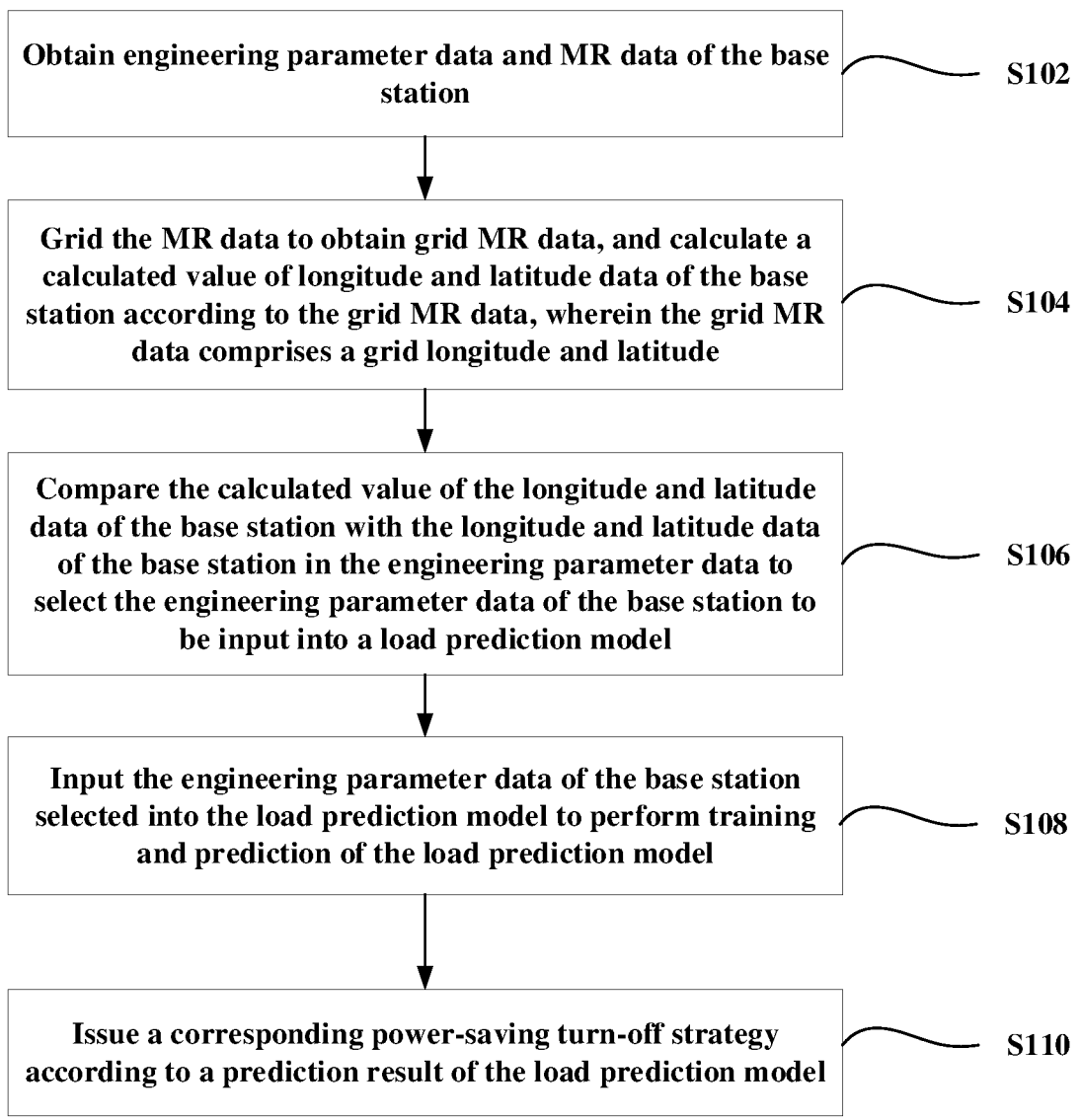
FIG. 1 is a flowchart showing a processing method for saving energy of a base station according to some embodiments of the present disclosure.

FIG. 1 is a flowchart showing a processing method for saving energy of a base station according to some embodiments of the present disclosure. As shown in FIG. 1, the method comprises steps S102 to S110.

In step S102, engineering parameter data and MR (Measurement Report) data of the base station are obtained. The engineering parameter data comprises longitude and latitude data of the base station obtained by measurement. The MR data comprises longitude and latitude data of a user terminal reported by the user terminal In some embodiments, the engineering parameter data further comprises direction angle data of the base station obtained by measurement, and the MR data further comprises direction angle data of the user terminal reported by the user terminal.

In step S104, the MR data is gridded to obtain grid MR data, and a calculated value of longitude and latitude data of the base station is calculated according to the grid MR data, wherein the grid MR data comprises a grid longitude and latitude.

For example, around a certain base station, there may be a plurality of user terminals, each of which reports the MR data so that the grid MR data may be obtained by processing the MR data within a grid with a square with a predetermined range (for example, a range of 50 meters*50 meters) serving as a grid. For example, an average value of the longitude and latitude of the terminal of the MR data within the grid is calculated as the grid longitude and latitude, and an average value of the direction angle of the terminal of the MR data within the grid is calculated as a grid direction angle.

In some embodiments, the grid MR data further comprise the grid direction angle. In some embodiments, the grid MR data further comprises: a base station type, an average RSRP (Reference Signal Receiving Power), a base station identification, the grid direction angle and number of a MR within a grid.

In some embodiments, the calculating of the calculated value of the longitude and latitude data of the base station according to the grid MR data comprises: selecting the grid MR data with an outdoor base station as the base station type, corresponding to a base station with a predetermined number of cells, and with the average RSRP greater than a first threshold; grouping the grid MR data according to the base station identification and the direction angle data of the base station to allocate the grid MR data into a corresponding cell; performing outlier detection on the grid MR data of each cell to remove abnormal grid MR data; calculating an average longitude and latitude of each cell of each base station according to the grid longitude and latitude in remaining grid MR data; and calculating an average longitude and latitude of the base station according to the average longitude and latitude of the each cell of the each base station, wherein the average longitude and latitude of the base station is the calculated value of the longitude and latitude data of the base station.

Here, the first threshold can be determined according to actual needs. For example, the first threshold ranges from −110 dB (decibel) to −100 dB. For example, the first threshold is −102 dB. Of course, those skilled in the art can understand that the scope of the first threshold of the present disclosure is not limited to this.

In step S106, the calculated value of the longitude and latitude data of the base station is compared with the longitude and latitude data of the base station in the engineering parameter data to select the engineering parameter data of the base station to be input into a load prediction model.

In some embodiments, the step S106 comprises: calculating a distance relationship value between the calculated value of the longitude and latitude of the base station and the longitude and latitude data of the base station in the engineering parameter data according to a distance calculation method; and selecting the engineering parameter data of the base station with the distance relationship value less than a second threshold as the engineering parameter data of the base station to be input into the load prediction model.

Here, the second threshold can be determined according to actual needs. For example, the second threshold ranges from 800 meters to 1000 meters. Of course, those skilled in the art can understand that the scope of the second threshold of the present disclosure is not limited to this.

In step S108, the engineering parameter data of the base station selected is input into the load prediction model to perform training and prediction of the load prediction model.

In some embodiments, the step S108 comprises: performing outlier removal on the engineering parameter data of the base station selected; clustering prediction points represented by the longitude and latitude data of the base station in the engineering parameter data by a density clustering algorithm, constructing features for training the load prediction model, and mining a density relationship between the prediction points to represent a clustering relationship between the prediction points; and after clustering the prediction points and constructing the features, performing model training based on a machine learning algorithm by using the engineering parameter data of the base station selected, the features and corresponding performance index data, and performing model accuracy evaluation.

In step S110, a corresponding power-saving turn-off strategy is issued according to a prediction result of the load prediction model.

So far, a processing method for saving energy of a base station according to some embodiments of the present disclosure is provided. The processing method comprises: obtaining engineering parameter data and measurement report (MR) data of the base station, wherein the engineering parameter data comprises longitude and latitude data of the base station obtained by measurement, and the MR data comprises longitude and latitude data of a user terminal reported by the user terminal; gridding the MR data to obtain grid MR data, and calculating a calculated value of longitude and latitude data of the base station according to the grid MR data, wherein the grid MR data comprises a grid longitude and latitude; comparing the calculated value of the longitude and latitude data of the base station with the longitude and latitude data of the base station in the engineering parameter data to select the engineering parameter data of the base station to be input into a load prediction model; inputting the engineering parameter data of the base station selected into the load prediction model to perform training and prediction of the load prediction model; and issuing a corresponding power-saving turn-off strategy according to a prediction result of the load prediction model. The method implements the auditing of the longitude and latitude data of the base station, so that the prediction accuracy of the model can be improved, and the effect of energy saving can be optimized.

The inventors of the present disclosure have further found that: the method of making use of AI technology to perform load prediction so as to achieve energy saving in the related art is still present with the following technical problem: when the energy-saving strategy is issued, correctness of a direction angle in the engineering parameter data is not taken into account in the existing method, thereby affecting the effect of energy saving of the base station.

In view of this, the embodiments of the present disclosure further provide a processing method for saving the energy of the base station, so as to improve the correctness of the direction angle in the engineering parameter data.

In some embodiments of the present disclosure, the processing method further comprises: selecting the engineering parameter data of the base station for determining a co-coverage cell according to the direction angle data in the engineering parameter data of the base station selected and the grid direction angle in the grid MR data corresponding to the base station selected; and obtaining the co-coverage cell according to the engineering parameter data of the base station for determining the co-coverage cell. The issuing of the corresponding power-saving turn-off strategy comprises: issuing the corresponding power-saving turn-off strategy according to the prediction result of the load prediction model and the co-coverage cell obtained. In this way, the direction angle data of the base station is audited, so that the accuracy of the cell co-coverage analysis can be improved, and the effect of energy saving can be optimized.

Figure 2:
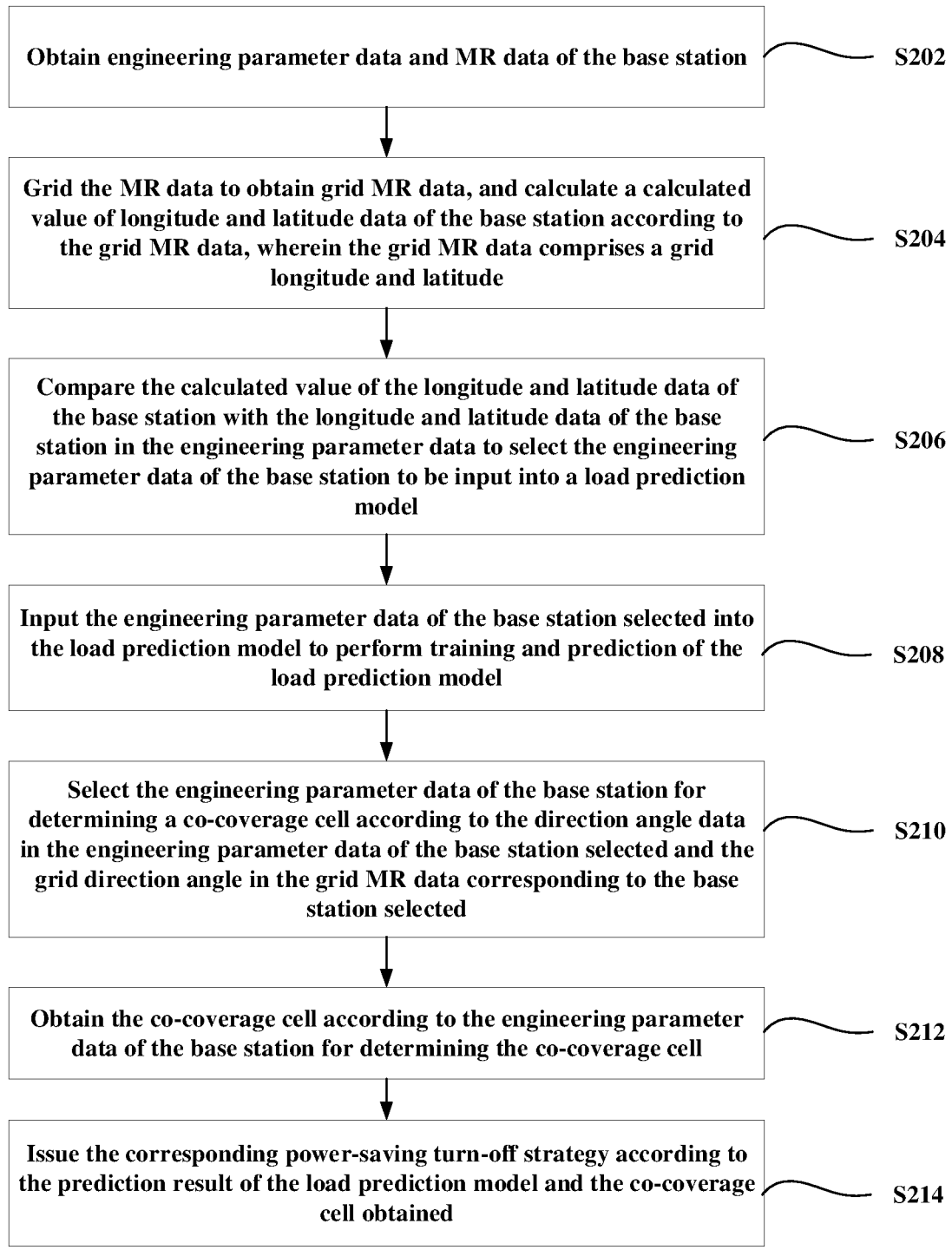
FIG. 2 is a flowchart showing a processing method for saving energy of a base station according to other embodiments of the present disclosure.

FIG. 2 is a flowchart showing a processing method for saving energy of abase station according to other embodiments of the present disclosure. As shown in FIG. 2, the processing method comprises steps S202 to S214.

In step S202, engineering parameter data and MR data of a base station are obtained.

In some embodiments, the engineering parameter data comprises longitude and latitude data and direction angle data of the base station obtained by measurement. The MR data comprises the longitude and latitude data of a user terminal and direction angle data of the user terminal reported by the user terminal.

In step S204, the MR data is gridded to obtain grid MR data, and a calculated value of longitude and latitude data of the base station is calculated according to the grid MR data, wherein the grid MR data comprises a grid longitude and latitude.

In some embodiments, the grid MR data further comprise: abase station type, an average RSRP, a base station identification, the grid direction angle and the number of a MR within a grid.

In step S206, the calculated value of the longitude and latitude data of the base station is compared with the longitude and latitude data of the base station in the engineering parameter data to select the engineering parameter data of the base station to be input into a load prediction model.

In step S208, the engineering parameter data of the base station selected is input into the load prediction model to perform training and prediction of the load prediction model.

In step S210, the engineering parameter data of the base station for determining a co-coverage cell is selected according to the direction angle data in the engineering parameter data of the base station selected and the grid direction angle in the grid MR data corresponding to the base station selected.

In some embodiments, the step S210 comprises: grouping the grid MR data of the base station selected according to the base station identification and the direction angle data of the base station (i.e., the direction angle data of the base station in the engineering parameter data), calculating a ratio of the number of the MR within each grid in each group to a sum of the number of the MR in the each group, and removing the grid MR data with the ratio less than a fifth threshold; grouping remaining grid MR data again according to the base station identification, and performing cell classification on the grid MR data in each group after grouping again by using a Gaussian kernel density function; calculating the direction angle data of each grid by using the grid longitude and latitude of each grid MR data of each cell obtained by the cell classification; calculating an average value of the direction angle data of the each cell according to the direction angle data of the each grid of the each cell, wherein the average value of the direction angle data of the each cell is used as a direction angle of the each cell; calculating a difference between the direction angle of the each cell of the base station and the direction angle data of the base station in the engineering parameter data, and calculating an average value of the difference; and making the engineering parameter data of the base station with the average value of the difference less than a sixth threshold as the engineering parameter data of the base station for determining the co-coverage cell. For example, the sixth threshold ranges from 30° to 60°. Of course, those skilled in the art can understand that the sixth threshold can be set according to actual conditions, and the scope of the sixth threshold in the present disclosure is not limited to this.

In step S212, the co-coverage cell is obtained according to the engineering parameter data of the base station for determining the co-coverage cell.

In some embodiments, the engineering parameter data of the base station further comprises a frequency band of the base station.

In some embodiments, the step S212 comprises: combining a plurality of cells two by two according to the frequency band to obtain, respectively, two cells corresponding to two frequency bands; calculating a distance between the two cells according to two longitude and latitude data of the base station in the engineering parameter data of the base station for determining the co-coverage cell corresponding to the two cells, and calculating a difference of two direction angle data of the base station in the engineering parameter data of the base station for determining the co-coverage cell corresponding to the two cells; and determining that the two cells are the co-coverage cell in a case where the distance between the two cells is less than a seventh threshold and the difference of the two direction angle data is less than an eighth threshold.

In step S214, a corresponding power-saving turn-off strategy is issued according to a prediction result of the load prediction model and the co-coverage cell obtained.

So far, a processing method for saving energy of a base station according to some embodiments of the present disclosure is provided. In this way, the auditing of the longitude and latitude data of the base station and the direction angle data of the base station is implemented, so that the accuracy of the prediction of the model and the accuracy of the cell coverage analysis can be improved, and the effect of energy saving can be optimized.

In some embodiments, the processing method further comprises: iterating the prediction result of the load prediction model and the power-saving turn-off strategy with a user perception index as an optimization target. In this way, the optimizing of the power-saving turn-off strategy can be implemented and the effect of energy saving can be improved.

Figure 3:
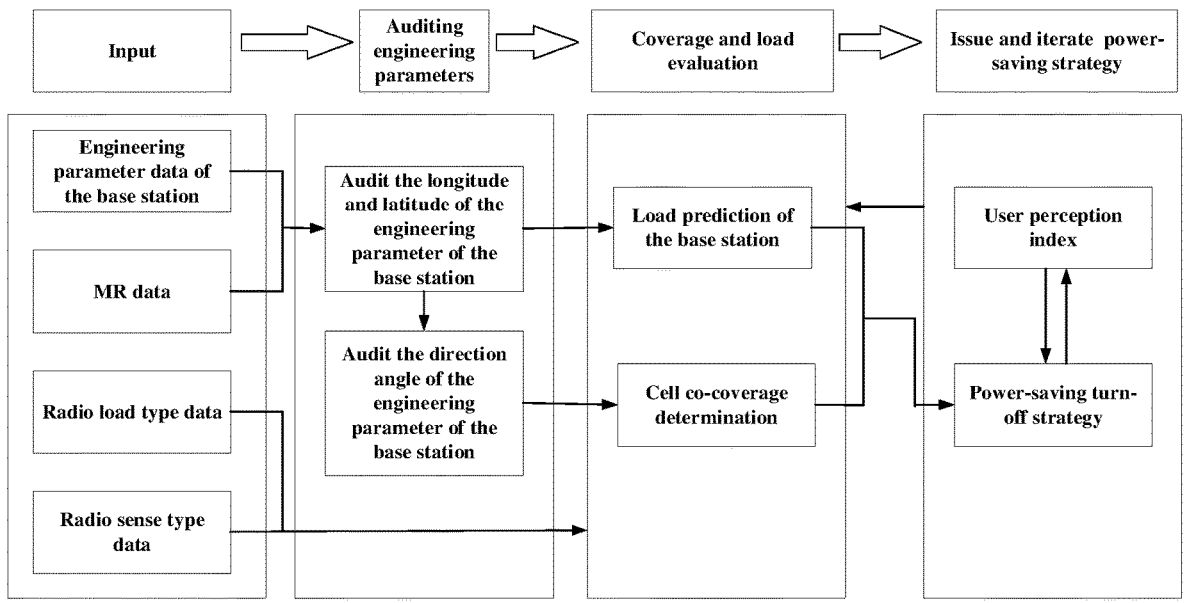
FIG. 3 is a flowchart showing a processing method for saving energy of a base station according to other embodiments of the present disclosure.

FIG. 3 is a flowchart showing a processing method for saving energy of abase station according to other embodiments of the present disclosure.

First of all, as shown in FIG. 3, data is input. For example, the data comprises engineering parameter data of the base station, MR data, radio load type data, radio sense type data and the like obtained by network management.

In some embodiments, the engineering parameter data of the base station comprises a base station identification (i.e., a base station ID), a cell identification (i.e., a cell ID), a name of the base station, a longitude, a latitude, direction angles of different cells, and the like. It should be noted here that, each base station may correspond to a plurality of (for example, three) direction angles, and each direction angle corresponds to one cell (also referred to as a sector).

In some embodiments, the radio sense type data comprises: uplink PRB (Physical Resource Block) utilization ratio, downlink PRB utilization ratio, average RRC (Radio Resource Control) connection number, maximum RRC connection number, user average ERAB (Evolved Radio Access Bearer) number, times of successful same-frequency switching, times of successful cross-frequency switching, CQI (Channel Quality Indication)-4 ratio, CQI-6 ratio, PDCP (Packet Data Convergence Protocol) layer uplink flow and PDCP layer downlink flow, and the like.

In some embodiments, the radio sense type data comprises: RRC establishment success rate, RRC reconstruction ratio, E-RAB drop rate, CQI quality ratio, user downlink sense rate, intra-system switching success rate, and the like.

In some embodiments, the engineering parameter data of the base station, the radio sense type data and the user perception type data can be extracted from the network management database, and the MR data comprising the longitude and latitude reported by the user terminal can be obtained from the northbound file interface of OMC (Operation and Maintenance Center). For example, the MR data is MRO_MDT (Maintenance, Repair & Operations; Minimization Drive Test) data.

Next, as shown in FIG. 3, the longitude and latitude and the direction angle of the base station in the engineering parameter data are audited respectively based on the MR data.

For example, data mining analysis is performed based on the MR data to audit the longitude and latitude of the base station: by processing the gridded MR data, outlier screening is performed by using the outlier detection algorithm LOF (Local Outlier Factor), and then the longitude and latitude of the base station are converged according to the calculation method of the center of mass, and the longitude and latitude of the base station converged is compared with the longitude and latitude in the engineering parameter data to select the engineering parameter data of the base station with correct latitude and longitude of the base station, the engineering parameter data of the base station selected being used as the input of the load prediction model.

For another example, the direction angle of the engineering parameter is audited by using the data mining analysis algorithm based on the MR data: an edge grid of the MR data under the base station is removed, cell classification is performed on the gridded MR data by using a Gaussian kernel density function, and the direction angle of each cell is calculated by using the direction angle calculation formula, the direction angle of each cell is compared with the direction angle of the base station in the engineering parameter data, so as to select the base station with no problem in the direction angle, and the engineering parameter data of the base station selected serve as the input for determining the cell co-coverage.

Next, as shown in FIG. 3, the engineering parameter data of the base station with correct longitude and latitude and their index data are selected as the input of the model for training, prediction and evaluation of the model.

For example, The base station identifier in the engineering data can be processed to remove odd base stations, and an abnormal value of the average utilization rate of downlink PRB may be processed. Afterwards, both of them combined.

Then, the prediction points represented by the longitude and latitude data of the base station in the engineering parameter data are clustered by using the density clustering DBSCAN (Density-Based Spatial Clustering of Applications with Noise), the density relationship between the prediction points is mined to represent the clustering relationship between the prediction points.

After clustering the prediction points, the model is trained based on the machine learning algorithm, and an accuracy ratio, a recall ratio, a Root Mean Squared Error (referred to as RMSE for short) and a Symmetry Mean Absolute Percentage Error (referred to as SMAPE for short) and the like are calculated to evaluate the accuracy of the model.

Next, as shown in FIG. 3, among the base stations with correct longitude and latitude of the base station, the base station with the correct direction angle of the engineering parameter data of is selected for co-coverage determination to obtain a co-coverage cell.

For example, it is possible to prepare the required engineering parameter data of the base station, comprising the base station ID, the cell ID, the longitude and latitude, the direction angle, the frequency point (or frequency band), and the like. The data is split according to the frequency band, and the related longitude and latitude is correlated with the direction angle; the frequency bands are combined two by two to determine whether there is a co-coverage cell based on the following conditions: if the distance between the longitudes and latitudes of the two cells is less than the seventh threshold, and the difference between the direction angles of the two cells is less than the eighth threshold (the eighth threshold may be set according to actual conditions of the existing network), the two cells are determined to be the co-coverage cell; otherwise, the two cells are not the co-coverage cell.

In some embodiments, the seventh threshold ranges from 50 meters to 100 meters. Of course, those skilled in the art can understand that the seventh threshold may be set according to actual conditions of the existing network, and the scope of the seventh threshold in the present disclosure is not limited to this.

In some embodiments, the eighth threshold ranges from 20° to 30°. Of course, those skilled in the art can understand that the eighth threshold may be set according to actual conditions of the existing network, and the scope of the eighth threshold in the present disclosure is not limited to this.

By determining that the two cells are the co-coverage cell, a power-saving turn-off strategy may be performed on one of the two cells, which saves the power consumption of the base station without affecting the communication of the users in the cells.

Next, as shown in FIG. 3, combined with the load prediction model and the co-coverage analysis result, a corresponding power-saving turn-off strategy is issued.

Next, as shown in FIG. 3, with a user perception index as an optimization target, the prediction result of the load prediction model and the power-saving turn-off strategy are iterated. In this way, power is conserved whilst ensuring the user experience. Here, the user perception index may be obtained by using known technologies.

So far, a processing method for saving energy of a base station according to other embodiments of the present disclosure is provided. In the method, the longitude and latitude and the direction angle of the base station are audited respectively using the data mining analysis technique based on the MR data, so as to improve the accuracy of load prediction and power-saving strategy issuance in power saving of the base station. In the method according to the present disclosure, the longitude and latitude and the direction angle of the base station are audited by using the data mining analysis technique, which is more intelligent, flexible and simple in process compared with the statistical method in the related art. In addition, the above-described method can make use of the existing data set interface, without improving the user terminal, so that it is easily popularized and realized.

Figure 4:
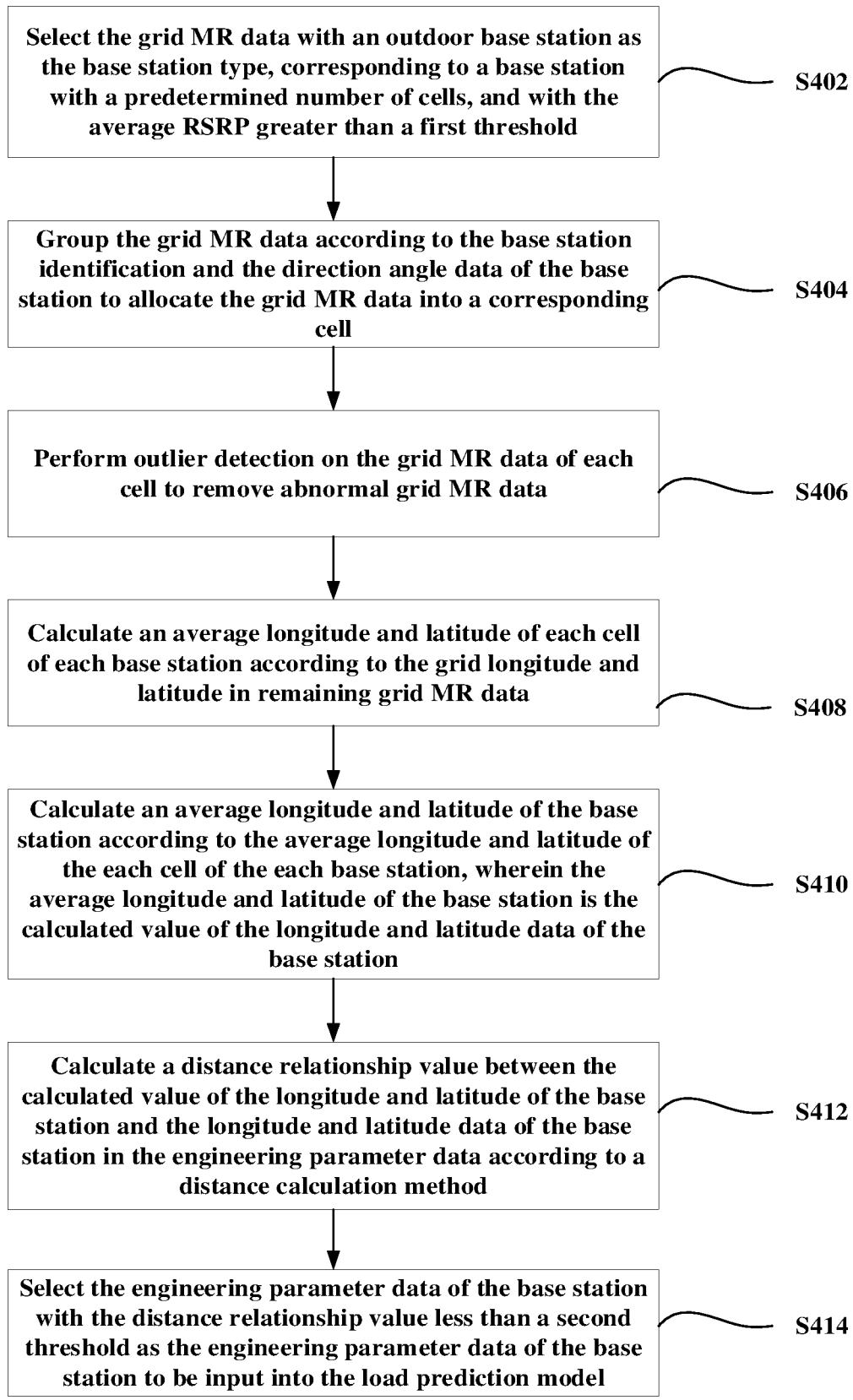
FIG. 4 is a flow chart showing a method for auditing a longitude and latitude of an engineering parameter of a base station according to some embodiments of the present disclosure.

FIG. 4 is a flow chart showing a method for auditing a longitude and latitude of an engineering parameter of a base station according to some embodiments of the present disclosure. As shown in FIG. 4, the method comprises steps S402 to S414.

In some embodiments, before the step 402, the MR data is gridded to obtain the grid MR data.

In some embodiments, after the MR data is gridded, the engineering parameter data may further be associated with the grid MR data, thus adding the fields of the longitude and latitude of the base station and the direction angle of the base station in the grid MR data. Of course, those skilled in the art can understand that the fields of the longitude and latitude of the base station and the direction angle of the base station may not be added in the grid MR data.

For example, the fields of the grid MR data are shown in the following Table 1:

TABLE 1

| Field List | | | | |
|---|---|---|---|---|
| 'Grid_id' | 'ECI' | 'Grid_longitude' | 'Grid_latitude' | 'Grid_count' |
| ID of the grid | ECI | Longitude of the grid | Latitude of the grid | the number of MRs in the grid |
| 'avg_RSRP' Average RSRP | 'Freq' Frequency | 'Grid_direction' Direction angle of the grid | 'eNodeBID' Base station identification | 'Direction' Direction angle of the base station |
| 'Longitude' Longitude of the base station | 'Latitude' Latitude of the base station | 'Type' Type of the base station | | |

Here, ECI is the base station cell identification.

In step S402, the grid MR data with an outdoor base station as the base station type, corresponding to a base station with a predetermined number (for example, 3) of cells and with an average RSRP greater than the first threshold is selected.

In some embodiments, the selected fields comprise: the base station ID, the direction angle, the number of the MRs within the grid, the grid longitude and latitude, and the like.

In step S404, the grid MR data is grouped according to the base station identification and the direction angle data of the base station to allocate the grid MR data into a corresponding cell.

In step S406, outlier detection is performed on the grid MR data of each cell to remove abnormal grid MR data.

For example, a noise grid of each cell is cleaned and discarded respectively by using the outlier detection LOF algorithm of unsupervised learning in machine learning.

In some embodiments, the step S406 comprises: setting a critical point K value as K=a third threshold*a sum of the number of the MR within the grid of the each cell, wherein the third threshold is a percentage; calculating a local outlier factor (LOF) value of each grid MR data of the each cell by using the critical point K value; and removing the grid MR data with the LOF value greater than a fourth threshold.

For example, the third threshold ranges from 90% to 97%. For example, the third threshold is 95%. Of course, those skilled in the art may understand that the third threshold of the present disclosure can be adjusted according to actual needs and is not limited to the above-described range.

Figure 5:
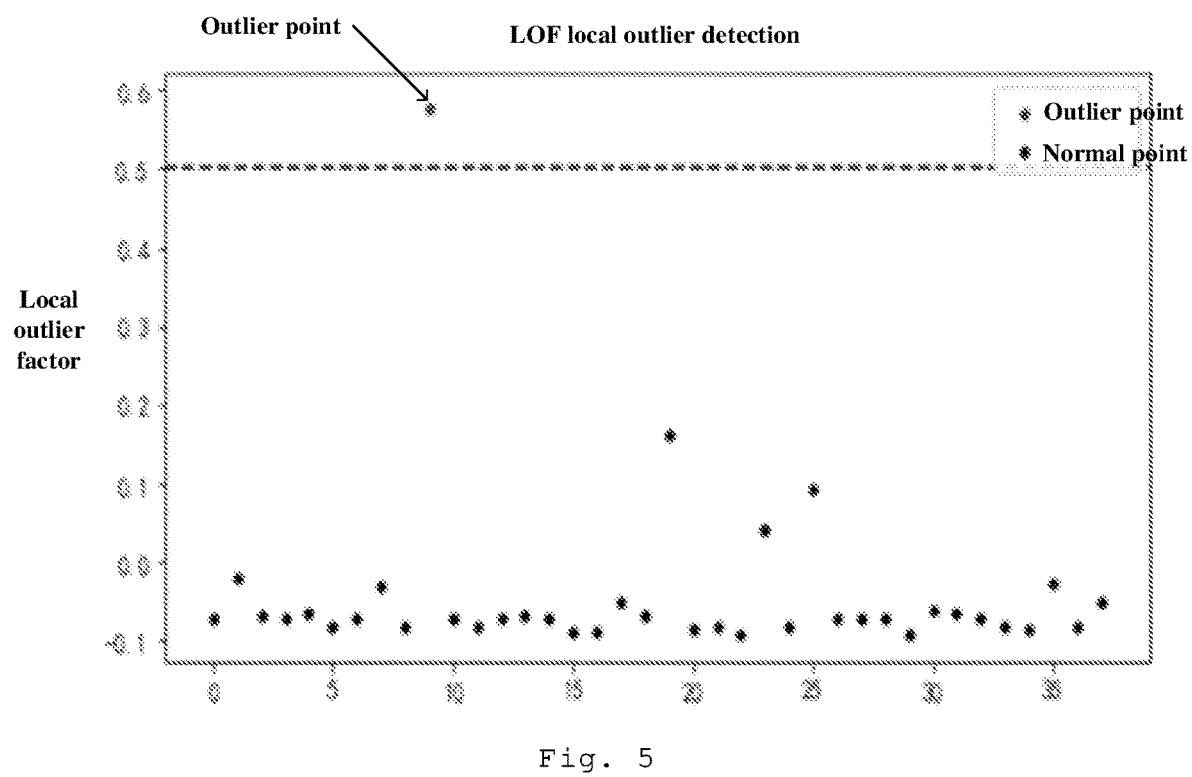
FIG. 5 is a schematic view showing outlier detection using LOF algorithm according to some embodiments of the present disclosure.

The LOF value of each grid of each group may be calculated by using the known calculation method and the K value, where the grid with the LOF value greater than the fourth threshold is an abnormal grid, so as to remove the abnormal grid (for example, the outlier as shown in FIG. 5).

For example, the fourth threshold ranges from 0.1 to 1. For example, the fourth threshold is 0.5. Of course, those skilled in the art can understand that the fourth threshold of the present disclosure may be adjusted according to actual needs and is not limited to the above-described range.

In step S408, an average longitude and latitude of each cell of each base station is calculated according to the grid longitude and latitude in remaining grid MR data.

For example, after removing the abnormal grid MR data, an average value of the grid longitude and latitude is calculated according to the grid longitude and latitude in the remaining grid MR data of each cell, wherein the average value of the grid longitude and latitude is the average longitude and latitude of each cell.

In step S410, an average longitude and latitude of the base station is calculated according to the average longitude and latitude of the each cell of the each base station, wherein the average longitude and latitude of the base station is the calculated value of the longitude and latitude data of the base station.

For example, an calculation formula of the average longitude and latitude (referred to as the center of mass) of the base station is:

$$x = \frac{1}{N}\sum_{i=1}^{N} x_i, \quad y = \frac{1}{N}\sum_{i=1}^{N} y_i, \tag{1}$$

wherein x represents an average longitude of the base station, $x_i$ represents an average longitude of each cell of the base station, y represents an average latitude of the base station, $y_i$ represents an average latitude of each cell of the base station, and N represents the number of cells of the base station.

In step S412, a distance relationship value between the calculated value of the longitude and latitude of the base station and the longitude and latitude data of the base station in the engineering parameter data is calculated according to a distance calculation method.

For example, the distance relationship value L between the calculated value (Lat1, Lng1) of the longitude and latitude of the base station and the longitude and latitude data (Lat2, Lng2) of the base station in the engineering parameter data is:

$$L = 2R\sin^{-1}\sqrt{\left(\sin\left(\frac{a}{2}\right)\right)^2 + \cos(Lat1)*\cos(Lat2)*\left(\sin\left(\frac{b}{2}\right)\right)^2} \tag{2}$$

where, $a = (Lat1 - Lat2)*\frac{\pi}{180}$, $b = (Lng1 - Lng2)*\frac{\pi}{180}$, wherein R is a radius of the earth (which may take the value of 6378 kilometers), Lat1 and Lat2 each are latitudes, and Lng1 and Lng2 each are longitudes.

In step S414, the engineering parameter data of the base station with the distance relationship value less than a second threshold is selected as the engineering parameter data of the base station to be input into the load prediction model.

So far, a method for auditing the longitude and latitude of the engineering parameter of the base station according to some embodiments of the present disclosure is provided. By auditing the longitude and latitude data of the base station, the accuracy of the prediction of the model can be improved, and the effect of energy saving can be optimized.

Figure 6:
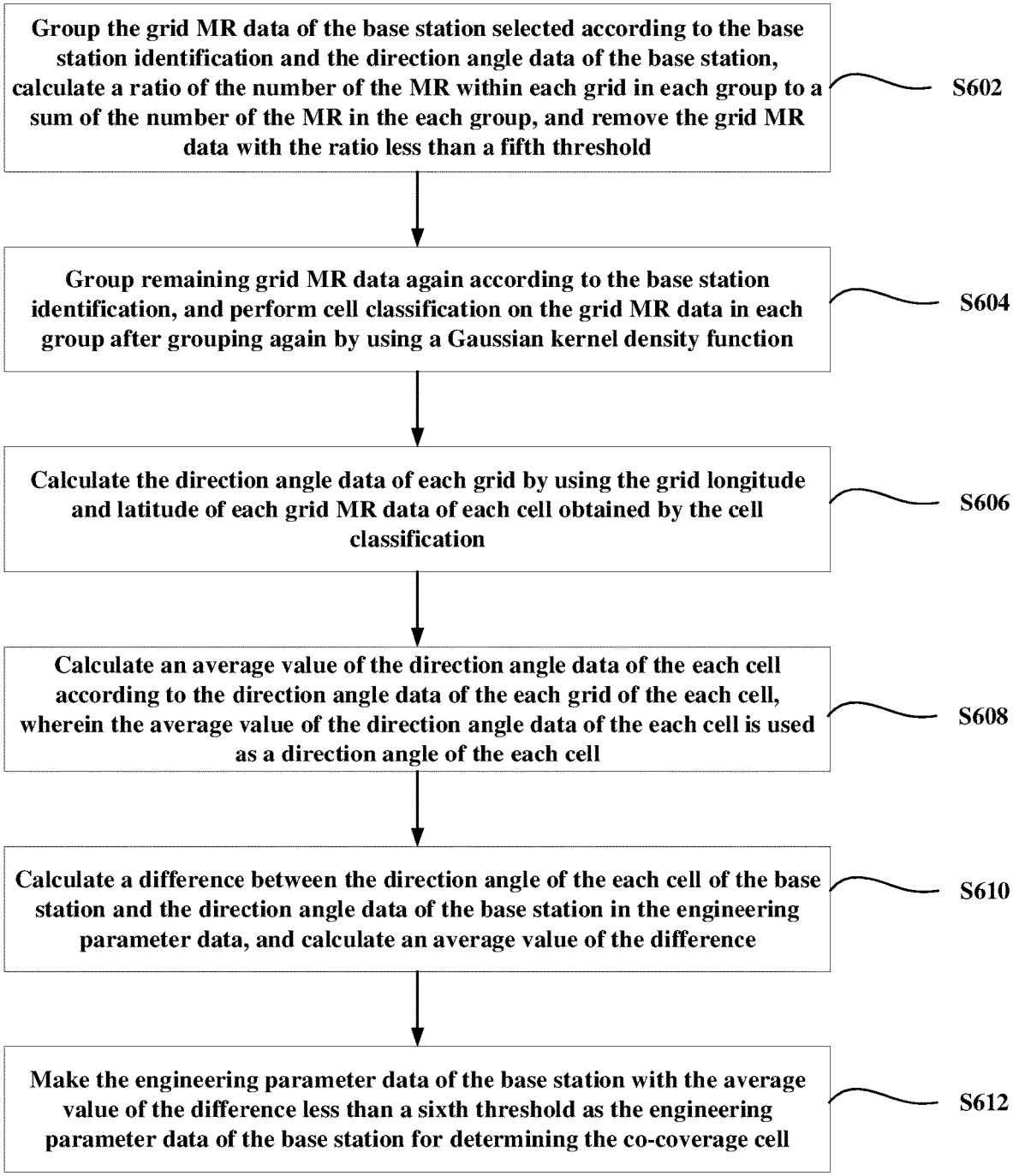
FIG. 6 is a flowchart showing a method for auditing a direction angle of an engineering parameter of a base station according to some embodiments of the present disclosure.

FIG. 6 is a flowchart showing a method for auditing a direction angle of an engineering parameter of a base station according to some embodiments of the present disclosure. As shown in FIG. 6, the method comprises steps S602 to S612.

In step S602, the grid MR data of the base station selected is grouped according to the base station identification and the direction angle data of the base station, a ratio of the number of the MR within each grid in each group to a sum of the number of the MR in the each group is calculated, and the grid MR data with the ratio less than a fifth threshold is removed. For example, a range of the fifth threshold is 0<the fifth threshold≤0.1. Of course, those skilled in the art can understand that the fifth threshold may be set according to actual conditions, and the scope of the fifth threshold in the present disclosure is not limited to this.

That is, the direction angle is audited for the grid MR data of the base stations that meets the second threshold, and grouping is performed according to the base station identification and the direction angle data of the base station, and the ratio rate of the number Grid_count of the MR within each grid in each group to the sum SUM (Grid_count) of the number of the MR in each group is calculated, as follows:

rate=Grid_count/SUM(Grid_count). (3)

The grid MR data with the rate less than a fifth threshold is removed, that is, an edge grid will be removed. In this way, the error caused by excessively discrete grids can be reduced and the accuracy of the auditing of the direction angle can be improved.

In step S604, remaining grid MR data is grouped again according to the base station identification, and cell classification is performed on the grid MR data in each group after grouping again by using a Gaussian kernel density function.

That is, in step S604, after the grid MR data with correct longitude and latitude of the base station is grouped according to the base station ID, the Gaussian kernel density function $f_n$ is recycled:

$$f_n = \exp\left(-\frac{\|x - y\|^2}{2\sigma^2}\right), \tag{4}$$

wherein σ is a width parameter of the function, x is a longitude and latitude of the grid to be classified, and Y is a center point (i.e., the longitude and latitude of the base station). In an objective function $h_\theta(x)$ constructed by obtained new features, the category is determined:

$$h_\theta(x)=\theta_0+\theta_1 f_1+\ldots+\theta_n f_n, \tag{5}$$

wherein θ is a coefficient of each kernel function and $f_n$ is a kernel function value calculated for each grid.

For the grid x, a new feature $f$ is calculated. When $0<h_\theta(x)\leq1$, it is determined that x belongs to the cell 1. When $1<h_\theta(x)\leq2$, it is determined that x belongs to the cell 2, and the remaining x belongs to the cell 3.

In step S606, the direction angle data of each grid is calculated by using the grid longitude and latitude of each grid MR data of each cell obtained by the cell classification.

After grid classification is completed, the direction angle is calculated for the grid within each cell by using the grid longitude and latitude. A calculation formula of the direction angle Direction is as follows:

$$\text{distance}_{North} = R*(Lng1-Lng2), \quad (6)$$

$$\text{distance}_{East} = R*\cos Lat1*(Lng1-Lng2), \quad (7)$$

$$\text{Direction} = \mod(\tan h^{-1}(\text{distance}_{East}, \text{distance}_{North}), 2*\pi), \quad (8)$$

wherein Lng1 is a longitude of one grid within the cell, Lat1 is a latitude of the one grid within the cell, Lng2 is a longitude of another grid within the cell, distance$_{North}$ is a distance of two longitudes and latitudes in a direction facing north, and distance$_{East}$ is a distance of the two longitudes and latitudes in a direction facing east.

In step S608, an average value of the direction angle data of the each cell is calculated according to the direction angle data of the each grid of the each cell, wherein the average value of the direction angle data of the each cell is used as a direction angle of the each cell.

In step S610, a difference between the direction angle of the each cell of the base station and the direction angle data of the base station in the engineering parameter data is calculated, and an average value of the difference is calculated.

In step S612, the engineering parameter data of the base station with the average value of the difference less than a sixth threshold is made as the engineering parameter data of the base station for determining the co-coverage cell.

For example, if the average value of the difference is greater than or equal to the sixth threshold, it is determined that the base station has an abnormal connection of the direction angle; and if the average value of the difference is less than the sixth threshold value, it serves as the input for the co-coverage determination under power saving.

So far, a method for auditing the direction angle of the engineering parameter of a base station according to some embodiments of the present disclosure is provided. By auditing the direction angle data of the base station, the accuracy of the cell co-coverage analysis can be improved, and the effect of energy saving can be optimized.

Figure 7:
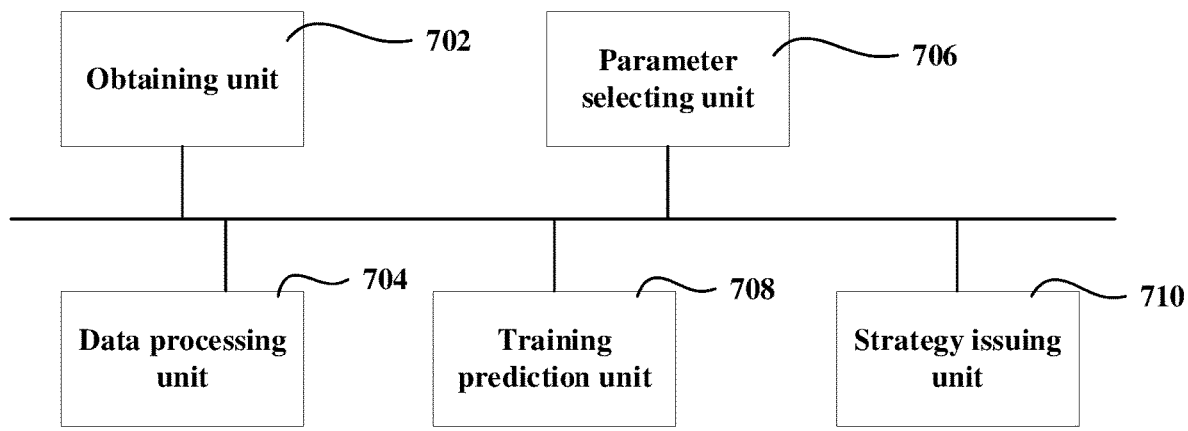
FIG. 7 is a schematic structural view showing a processing device for saving energy of a base station according to some embodiments of the present disclosure.

FIG. 7 is a schematic structural view showing a processing device for saving energy of a base station according to some embodiments of the present disclosure. As shown in FIG. 7, the processing device comprises: an obtaining unit 702, a data processing unit 704, a parameter selecting unit 706, a training prediction unit 708 and a strategy issuing unit 710.

The obtaining unit 702 is configured to obtain engineering parameter data and measurement report (MR) data of the base station. The engineering parameter data comprises longitude and latitude data of the base station obtained by measurement. The MR data comprises longitude and latitude data of a user terminal reported by the user terminal.

The data processing unit 704 is configured to grid the MR data to obtain grid MR data, and calculate a calculated value of longitude and latitude data of the base station according to the grid MR data. The grid MR data comprises a grid longitude and latitude.

The parameter selecting unit 706 is configured to compare the calculated value of the longitude and latitude data of the base station with the longitude and latitude data of the base station in the engineering parameter data to select the engineering parameter data of the base station to be input into a load prediction model.

The training prediction unit 708 is configured to input the engineering parameter data of the base station selected into the load prediction model to perform training and prediction of the load prediction model.

The strategy issuing unit 710 is configured to issue a corresponding power-saving turn-off strategy according to a prediction result of the load prediction model.

So far, a processing device for saving energy of a base station according to some embodiments of the present disclosure is provided. By auditing the longitude and latitude data of the base station, the accuracy of the prediction of the model can be improved, and the effect of energy saving can be optimized.

In some embodiments, the engineering parameter data further comprises direction angle data of the base station obtained by measurement, the MR data further comprises direction angle data of the user terminal reported by the user terminal, and the grid MR data further comprises a grid direction angle.

In some embodiments, the parameter selecting unit 706 is further configured to select the engineering parameter data of the base station for determining a co-coverage cell according to the direction angle data in the engineering parameter data of the base station selected and the grid direction angle in the grid MR data corresponding to the base station selected. The obtaining unit 702 is further configured to obtain the co-coverage cell according to the engineering parameter data of the base station for determining the co-coverage cell. The strategy issuing unit 710 is configured to issue the corresponding power-saving turn-off strategy according to the prediction result of the load prediction model and the co-coverage cell obtained.

In some embodiments, the grid MR data further comprises: a base station type, an average reference signal receiving power (RSRP), a base station identification, the grid direction angle and number of a MR within a grid.

In some embodiments, the data processing unit 704 is configured to select the grid MR data with an outdoor base station as the base station type, corresponding to a base station with a predetermined number of cells, and with the average RSRP greater than a first threshold, group the grid MR data according to the base station identification and the direction angle data of the base station to allocate the grid MR data into a corresponding cell, perform outlier detection on the grid MR data of each cell to remove abnormal grid MR data, calculate an average longitude and latitude of each cell of each base station according to the grid longitude and latitude in remaining grid MR data, and calculate an average longitude and latitude of the base station according to the average longitude and latitude of the each cell of the each base station, wherein the average longitude and latitude of the base station is the calculated value of the longitude and latitude data of the base station.

In some embodiments, the parameter selecting unit 706 is configured to calculate a distance relationship value between the calculated value of the longitude and latitude of the base station and the longitude and latitude data of the base station in the engineering parameter data according to a distance calculation method, and select the engineering parameter data of the base station with the distance relationship value less than a second threshold as the engineering parameter data of the base station to be input into the load prediction model.

In some embodiments, the data processing unit 704 is configured to set a critical point K value as K=a third threshold*a sum of the number of the MR within the grid of the each cell, wherein the third threshold is a percentage, calculate a local outlier factor (LOF) value of each grid MR data of the each cell by using the critical point K value, and remove the grid MR data with the LOF value greater than a fourth threshold.

In some embodiments, the parameter selecting unit 706 is configured to group the grid MR data of the base station selected according to the base station identification and the direction angle data of the base station, calculate a ratio of the number of the MR within each grid in each group to a sum of the number of the MR in the each group, remove the grid MR data with the ratio less than a fifth threshold, group remaining grid MR data again according to the base station identification, and perform cell classification on the grid MR data in each group after grouping again by using a Gaussian kernel density function, calculate the direction angle data of each grid by using the grid longitude and latitude of each grid MR data of each cell obtained by the cell classification, calculate an average value of the direction angle data of the each cell according to the direction angle data of the each grid of the each cell, wherein the average value of the direction angle data of the each cell is used as a direction angle of the each cell, calculate a difference between the direction angle of the each cell of the base station and the direction angle data of the base station in the engineering parameter data, calculate an average value of the difference, and make the engineering parameter data of the base station with the average value of the difference less than a sixth threshold as the engineering parameter data of the base station for determining the co-coverage cell.

In some embodiments, the training prediction unit 708 is configured to perform outlier removal on the engineering parameter data of the base station selected, cluster prediction points represented by the longitude and latitude data of the base station in the engineering parameter data by a density clustering algorithm, construct features for training the load prediction model, mine a density relationship between the prediction points to represent a clustering relationship between the prediction points, after clustering the prediction points and constructing the features, perform model training based on a machine learning algorithm by using the engineering parameter data of the base station selected, the features and corresponding performance index data, and perform model accuracy evaluation.

In some embodiments, the engineering parameter data of the base station further comprises a frequency band of the base station. The obtaining unit 702 is configured to combine a plurality of cells two by two according to the frequency band to obtain, respectively, two cells corresponding to two frequency bands, calculate a distance between the two cells according to two longitude and latitude data of the base station in the engineering parameter data of the base station for determining the co-coverage cell corresponding to the two cells, calculate a difference of two direction angle data of the base station in the engineering parameter data of the base station for determining the co-coverage cell corresponding to the two cells, and determine that the two cells are the co-coverage cell in a case where the distance between the two cells is less than a seventh threshold and the difference of the two direction angle data is less than an eighth threshold.

In some embodiments, the strategy issuing unit 710 is further configured to iterate the prediction result of the load prediction model and the power-saving turn-off strategy with a user perception index as an optimization target.

Figure 8:
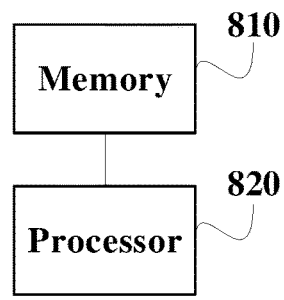
FIG. 8 is a schematic structural view showing a processing device for saving energy of a base station according to other embodiments of the present disclosure.

FIG. 8 is a schematic structural view showing a processing device for saving energy of a base station according to other embodiments of the present disclosure. The processing device comprises a memory 810 and a processor 820.

The memory 810 may be a magnetic disk, a flash memory or any other non-volatile storage medium. The memory is configured to store instructions in the embodiment corresponding to at least one of FIGS. 1 to 4 or FIG. 6.

The processor 820 is coupled to the memory 810 and may be implemented as one or more integrated circuits, such as a microprocessor or microcontroller. The processor 820 is configured to execute the instructions stored in the memory. By auditing the longitude and latitude data of the base station, the accuracy of the prediction of the model can be improved, and the effect of energy saving can be optimized.

Figure 9:
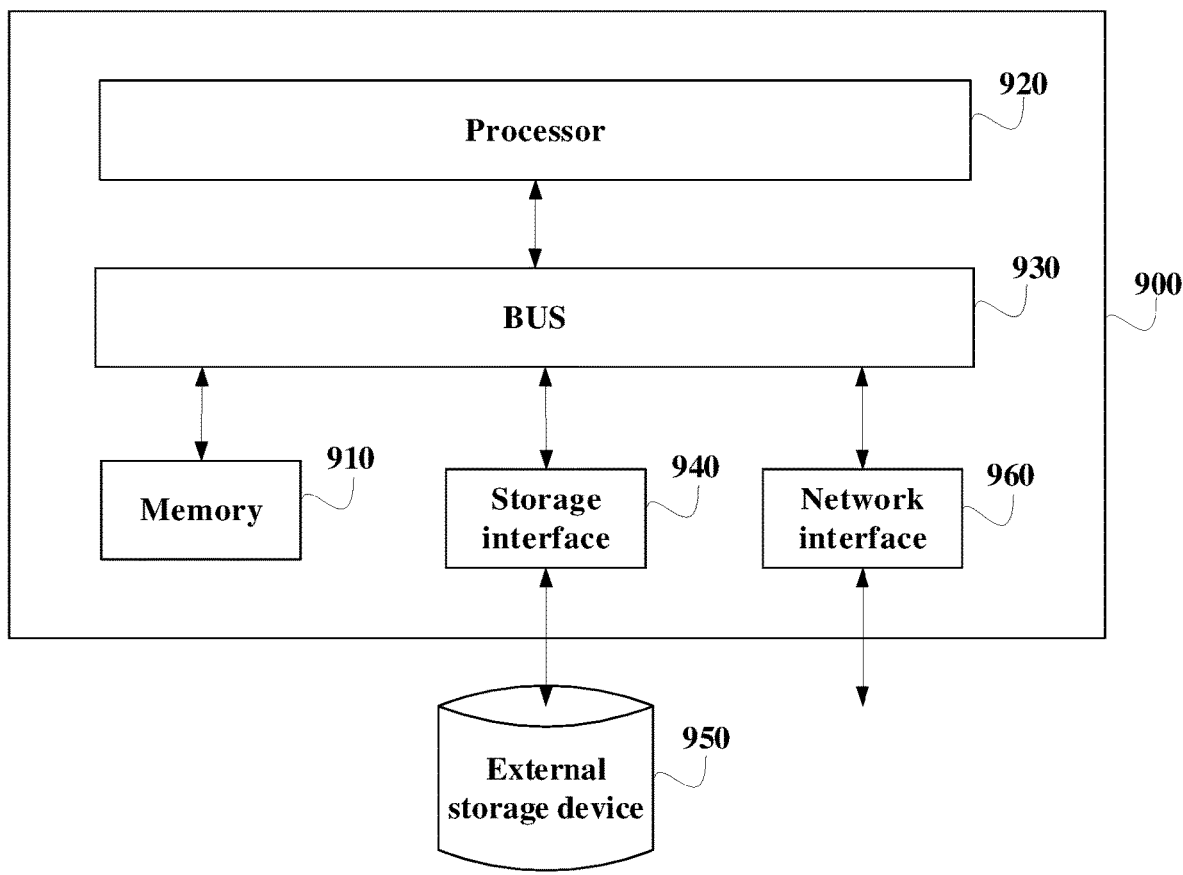
FIG. 9 is a schematic structural view showing a processing device for saving energy of a base station according to other embodiments of the present disclosure.

In some embodiments, also as shown in FIG. 9, the processing device 900 comprises a memory 910 and a processor 920. The processor 920 is coupled to the memory 910 through a BUS 930. The processing device 900 may also be connected to an external storage device 950 through a storage interface 940 so as to call external data, and may also be connected to a network or another computer system (not shown) through a network interface 960, which will not be described in detail here.

In the embodiment, the data instructions are stored in the memory, and then the above-described instructions are processed by the processor. By auditing the longitude and latitude data of the base station, the accuracy of the prediction of the model can be improved, and the effect of energy saving can be optimized.

In other embodiments, the present disclosure also provides a non-transitory computer-readable storage medium having computer program instructions stored thereon, when executed by a processor, implement steps of the method in the embodiments corresponding to at least one of FIGS. 1 to 4 or FIG. 6. Those skilled in the art will appreciate that the embodiments of the present disclosure may be provided as a method, device, or computer program product. Accordingly, the present disclosure may take the form of an entirely hardware embodiment, an entirely software embodiment, or a combination of software and hardware aspects. Moreover, the present disclosure may take the form of a computer program product embodied in one or more computer-usable non-transitory storage media (comprising but not limited to disk memory, CD-ROM, optical memory, or the like) containing computer usable program codes therein.

The present disclosure is described with reference to the flow charts and/or block views of the methods, devices (systems), and computer program products according to the embodiments of the present disclosure. It will be understood that each process and/or block of the flow charts and/or block views as well as a combination of processes and/or blocks of the flow charts and/or block views may be implemented by a computer program instruction. These computer program instructions may be provided to a processor of a general purpose computer, a special purpose computer, an embedded processing machine, or other programmable data processing devices to produce a machine, such that the instructions executed by a processor of a computer or other programmable data processing devices produce a device for realizing a function designated in one or more processes of a flow chart and/or one or more blocks of a block view.

These computer program instructions may also be stored in a computer readable memory that may guide a computer or other programmable data processing device to operate in a particular manner, such that the instructions stored in the computer readable memory produce a manufacture comprising an instruction device. The instruction device realizes a function designated in one or more processes in a flow chart or one or more blocks in a block view.

These computer program instructions may also be loaded onto a computer or other programmable data processing devices, such that a series of operational steps are performed on a computer or other programmable device to produce a computer-implemented processing, such that the instructions executed on a computer or other programmable devices provide steps for realizing a function designated in one or more processes of the flow chart and/or one or more blocks in the block view.

Hitherto, the present disclosure has been described in detail. Some details well known in the art are not described in order to avoid obscuring the concept of the present disclosure. According to the above description, those skilled in the art would fully understand how to implement the technical solutions disclosed here.

Although some specific embodiments of the present disclosure have been described in detail by way of examples, those skilled in the art should understand that the above examples are only for the purpose of illustration but are not intended to limit the scope of the present disclosure. It should be understood by those skilled in the art that modifications to the above embodiments may be made without departing from the scope and spirit of the present disclosure. The scope of the present disclosure is defined by the appended claims.

What is claimed is:

1. A processing method for saving energy of a base station, comprising:

obtaining engineering parameter data and measurement report (MR) data of the base station, wherein the engineering parameter data comprises longitude and latitude data of the base station obtained by measurement, and the MR data comprises longitude and latitude data of a user terminal reported by the user terminal;

gridding the MR data to obtain grid MR data, and calculating a calculated value of longitude and latitude data of the base station according to the grid MR data, wherein the grid MR data comprises a grid longitude and latitude;

comparing the calculated value of the longitude and latitude data of the base station with the longitude and latitude data of the base station in the engineering parameter data to select the engineering parameter data of the base station to be input into a load prediction model;

inputting the engineering parameter data of the base station selected into the load prediction model to perform training and prediction of the load prediction model; and issuing a corresponding power-saving turn-off strategy according to a prediction result of the load prediction model;

wherein the engineering parameter data further comprises direction angle data of the base station obtained by measurement, the MR data further comprises direction angle data of the user terminal reported by the user terminal, and the grid MR data further comprises a grid direction angle;

the processing method further comprises: selecting the engineering parameter data of the base station for determining a co-coverage cell according to the direction angle data in the engineering parameter data of the base station selected and the grid direction angle in the grid MR data corresponding to the base station selected; and obtaining the co-coverage cell according to the engineering parameter data of the base station for determining the co-coverage cell; and the issuing of the corresponding power-saving turn-off strategy comprises: issuing the corresponding power-saving turn-off strategy according to the prediction result of the load prediction model and the co-coverage cell obtained;

the grid MR data further comprises: a base station type, an average reference signal receiving power (RSRP), a base station identification, the grid direction angle and number of a MR within a grid; and the calculating of the calculated value of the longitude and latitude data of the base station according to the grid MR data comprises:

selecting the grid MR data with an outdoor base station as the base station type, corresponding to a base station with a predetermined number of cells, and with the average RSRP greater than a first threshold;

grouping the grid MR data according to the base station identification and the direction angle data of the base station to allocate the grid MR data into a corresponding cell;

performing outlier detection on the grid MR data of each cell to remove abnormal grid MR data;

calculating an average longitude and latitude of each cell of each base station according to the grid longitude and latitude in remaining grid MR data; and calculating an average longitude and latitude of the base station according to the average longitude and latitude of the each cell of the each base station, wherein the average longitude and latitude of the base station is the calculated value of the longitude and latitude data of the base station.

2. The processing method according to claim 1, wherein the comparing of the calculated value of the longitude and latitude data of the base station with the longitude and latitude data of the base station in the engineering parameter data comprises:

calculating a distance relationship value between the calculated value of the longitude and latitude of the base station and the longitude and latitude data of the base station in the engineering parameter data according to a distance calculation method; and selecting the engineering parameter data of the base station with the distance relationship value less than a second threshold as the engineering parameter data of the base station to be input into the load prediction model.

3. The processing method according to claim 1, wherein the performing of the outlier detection on the grid MR data of the each cell comprises:

setting a critical point K value as K=a third threshold*a sum of the number of the MR within the grid of the each cell, wherein the third threshold is a percentage;

calculating a local outlier factor (LOF) value of each grid MR data of the each cell by using the critical point K value; and removing the grid MR data with the LOF value greater than a fourth threshold.

4. The processing method according to claim 1, wherein the selecting of the engineering parameter data of the base station for determining the co-coverage cell according to the direction angle data in the engineering parameter data of the base station selected and the grid direction angle in the grid MR data corresponding to the base station selected comprises:

grouping the grid MR data of the base station selected according to the base station identification and the direction angle data of the base station, calculating a ratio of the number of the MR within each grid in each group to a sum of the number of the MR in the each group, and removing the grid MR data with the ratio less than a fifth threshold;

grouping remaining grid MR data again according to the base station identification, and performing cell classification on the grid MR data in each group after grouping again by using a Gaussian kernel density function;

calculating the direction angle data of each grid by using the grid longitude and latitude of each grid MR data of each cell obtained by the cell classification;

calculating an average value of the direction angle data of the each cell according to the direction angle data of the each grid of the each cell, wherein the average value of the direction angle data of the each cell is used as a direction angle of the each cell;

calculating a difference between the direction angle of the each cell of the base station and the direction angle data of the base station in the engineering parameter data, and calculating an average value of the difference; and making the engineering parameter data of the base station with the average value of the difference less than a sixth threshold as the engineering parameter data of the base station for determining the co-coverage cell.

5. The processing method according to claim 1, wherein the inputting of the engineering parameter data of the base station selected into the load prediction model to perform the training and the prediction of the load prediction model comprises:

performing outlier removal on the engineering parameter data of the base station selected;

clustering prediction points represented by the longitude and latitude data of the base station in the engineering parameter data by a density clustering algorithm, constructing features for training the load prediction model, and mining a density relationship between the prediction points to represent a clustering relationship between the prediction points; and after clustering the prediction points and constructing the features, performing model training based on a machine learning algorithm by using the engineering parameter data of the base station selected, the features and corresponding performance index data, and performing model accuracy evaluation.

6. The processing method according to claim 1, wherein:

the engineering parameter data of the base station further comprises a frequency band of the base station; and the obtaining of the co-coverage cell according to the engineering parameter data of the base station for determining the co-coverage cell comprises:

combining a plurality of cells two by two according to the frequency band to obtain, respectively, two cells corresponding to two frequency bands;

calculating a distance between the two cells according to two longitude and latitude data of the base station in the engineering parameter data of the base station for determining the co-coverage cell corresponding to the two cells, and calculating a difference of two direction angle data of the base station in the engineering parameter data of the base station for determining the co-coverage cell corresponding to the two cells; and determining that the two cells are the co-coverage cell in a case where the distance between the two cells is less than a seventh threshold and the difference of the two direction angle data is less than an eighth threshold.

7. The processing method according to claim 1, further comprising:

iterating the prediction result of the load prediction model and the corresponding power-saving turn-off strategy with a user perception index as an optimization target.

8. A processing device for saving energy of a base station, comprising:

a memory; and a processor coupled to the memory, wherein the processor is configured to, based on instructions stored in the memory, obtain engineering parameter data and measurement report (MR) data of the base station, wherein the engineering parameter data comprises longitude and latitude data of the base station obtained by measurement, and the MR data comprises longitude and latitude data of a user terminal reported by the user terminal;

grid the MR data to obtain grid MR data, and calculate a calculated value of longitude and latitude data of the base station according to the grid MR data, wherein the grid MR data comprises a grid longitude and latitude;

compare the calculated value of the longitude and latitude data of the base station with the longitude and latitude data of the base station in the engineering parameter data to select the engineering parameter data of the base station to be input into a load prediction model;

input the engineering parameter data of the base station selected into the load prediction model to perform training and prediction of the load prediction model; and issue a corresponding power-saving turn-off strategy according to a prediction result of the load prediction model;

wherein the engineering parameter data further comprises direction angle data of the base station obtained by measurement, the MR data further comprises direction angle data of the user terminal reported by the user terminal, and the grid MR data further comprises a grid direction angle;

the processor is further configured to select the engineering parameter data of the base station for determining a co-coverage cell according to the direction angle data in the engineering parameter data of the base station selected and the grid direction angle in the grid MR data corresponding to the base station selected, and obtain the co-coverage cell according to the engineering parameter data of the base station for determining the co-coverage cell; and the processor is configured to issue the corresponding power-saving turn-off strategy according to the prediction result of the load prediction model and the co-coverage cell obtained;

the grid MR data further comprises: a base station type, an average reference signal receiving power (RSRP), a base station identification, the grid direction angle and number of a MR within a grid; and the processor is configured to select the grid MR data with an outdoor base station as the base station type, corresponding to a base station with a predetermined number of cells, and with the average RSRP greater than a first threshold, group the grid MR data according to the base station identification and the direction angle data of the base station to allocate the grid MR data into a corresponding cell, perform outlier detection on the grid MR data of each cell to remove abnormal grid MR data, calculate an average longitude and latitude of each cell of each base station according to the grid longitude and latitude in remaining grid MR data, and calculate an average longitude and latitude of the base station according to the average longitude and latitude of the each cell of the each base station, wherein the average longitude and latitude of the base station is the calculated value of the longitude and latitude data of the base station.

9. The processing device according to claim 8, wherein the processor is configured to calculate a distance relationship value between the calculated value of the longitude and latitude of the base station and the longitude and latitude data of the base station in the engineering parameter data according to a distance calculation method, and select the engineering parameter data of the base station with the distance relationship value less than a second threshold as the engineering parameter data of the base station to be input into the load prediction model.

10. The processing device according to claim 8, wherein the processor is configured to set a critical point K value as K=a third threshold*a sum of the number of the MR within the grid of the each cell, wherein the third threshold is a percentage, calculate a local outlier factor (LOF) value of each grid MR data of the each cell by using the critical point K value, and remove the grid MR data with the LOF value greater than a fourth threshold.

11. The processing device according to claim 8, wherein the processor is configured to group the grid MR data of the base station selected according to the base station identification and the direction angle data of the base station, calculate a ratio of the number of the MR within each grid in each group to a sum of the number of the MR in the each group, remove the grid MR data with the ratio less than a fifth threshold, group remaining grid MR data again according to the base station identification, perform cell classification on the grid MR data in each group after grouping again by using a Gaussian kernel density function, calculate the direction angle data of each grid by using the grid longitude and latitude of each grid MR data of each cell obtained by the cell classification, calculate an average value of the direction angle data of the each cell according to the direction angle data of the each grid of the each cell, wherein the average value of the direction angle data of the each cell is used as a direction angle of the each cell, calculate a difference between the direction angle of the each cell of the base station and the direction angle data of the base station in the engineering parameter data, calculate an average value of the difference, and make the engineering parameter data of the base station with the average value of the difference less than a sixth threshold as the engineering parameter data of the base station for determining the co-coverage cell.

12. A non-transitory computer-readable storage medium having computer program instructions stored thereon that, when executed by a processor, cause the processor to:
obtain engineering parameter data and measurement report (MR) data of the base station, wherein the engineering parameter data comprises longitude and latitude data of the base station obtained by measurement, and the MR data comprises longitude and latitude data of a user terminal reported by the user terminal;
grid the MR data to obtain grid MR data, and calculate a calculated value of longitude and latitude data of the base station according to the grid MR data, wherein the grid MR data comprises a grid longitude and latitude;
compare the calculated value of the longitude and latitude data of the base station with the longitude and latitude data of the base station in the engineering parameter data to select the engineering parameter data of the base station to be input into a load prediction model;
input the engineering parameter data of the base station selected into the load prediction model to perform training and prediction of the load prediction model; and
issue a corresponding power-saving turn-off strategy according to a prediction result of the load prediction model;
wherein the engineering parameter data further comprises direction angle data of the base station obtained by measurement, the MR data further comprises direction angle data of the user terminal reported by the user terminal, and the grid MR data further comprises a grid direction angle; and
the computer program instructions, when executed by the processor, cause the processor to:
select the engineering parameter data of the base station for determining a co-coverage cell according to the direction angle data in the engineering parameter data of the base station selected and the grid direction angle in the grid MR data corresponding to the base station selected;
obtain the co-coverage cell according to the engineering parameter data of the base station for determining the co-coverage cell; and
issue the corresponding power-saving turn-off strategy according to the prediction result of the load prediction model and the co-coverage cell obtained;
the grid MR data further comprises: a base station type, an average reference signal receiving power (RSRP), a base station identification, the grid direction angle and number of a MR within a grid; and
the computer program instructions, when executed by the processor, cause the processor to:
select the grid MR data with an outdoor base station as the base station type, corresponding to a base station with a predetermined number of cells, and with the average RSRP greater than a first threshold;
group the grid MR data according to the base station identification and the direction angle data of the base station to allocate the grid MR data into a corresponding cell;
perform outlier detection on the grid MR data of each cell to remove abnormal grid MR data;
calculate an average longitude and latitude of each cell of each base station according to the grid longitude and latitude in remaining grid MR data; and
calculate an average longitude and latitude of the base station according to the average longitude and latitude of the each cell of the each base station, wherein the average longitude and latitude of the base station is the calculated value of the longitude and latitude data of the base station.

13. The non-transitory computer-readable storage medium according to claim 12, wherein the computer program instructions, when executed by the processor, cause the processor to:
calculate a distance relationship value between the calculated value of the longitude and latitude of the base station and the longitude and latitude data of the base station in the engineering parameter data according to a distance calculation method; and
select the engineering parameter data of the base station with the distance relationship value less than a second threshold as the engineering parameter data of the base station to be input into the load prediction model.

14. The non-transitory computer-readable storage medium according to claim 12, wherein the computer program instructions, when executed by the processor, cause the processor to:
- set a critical point K value as K=a third threshold*a sum of the number of the MR within the grid of the each cell, wherein the third threshold is a percentage;
- calculate a local outlier factor (LOF) value of each grid MR data of the each cell by using the critical point K value; and
- remove the grid MR data with the LOF value greater than a fourth threshold.

* * * * *